(12) United States Patent
Sayapin et al.

(10) Patent No.: US 11,941,127 B2
(45) Date of Patent: *Mar. 26, 2024

(54) FIRMWARE PASSWORD MANAGEMENT

(71) Applicant: VMware, Inc., Palo Alto, CA (US)

(72) Inventors: Evgeniy Sayapin, Austin, TX (US); Stephanie Bauman, Austin, TX (US); Neeraj Saluja, Round Rock, TX (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,114

(22) Filed: Nov. 18, 2022

(65) Prior Publication Data

US 2023/0078733 A1 Mar. 16, 2023

Related U.S. Application Data

(63) Continuation of application No. 16/910,539, filed on Jun. 24, 2020, now Pat. No. 11,507,667.

(51) Int. Cl.
| | |
|---|---|
| *G06F 21/46* | (2013.01) |
| *G06F 8/71* | (2018.01) |
| *G06F 21/31* | (2013.01) |
| *G06F 21/57* | (2013.01) |

(52) U.S. Cl.
CPC .............. *G06F 21/572* (2013.01); *G06F 8/71* (2013.01); *G06F 21/31* (2013.01); *G06F 21/46* (2013.01); *G06F 2221/2131* (2013.01)

(58) Field of Classification Search
CPC ........ G06F 21/572; G06F 21/31; G06F 21/46; G06F 8/71; G06F 2221/2131
See application file for complete search history.

(56) References Cited

U.S. PATENT DOCUMENTS

| | | | |
|---|---|---|---|
| 2012/0011577 A1* | 1/2012 | Mashimo | G06F 21/44 726/7 |
| 2015/0047022 A1 | 2/2015 | Von Der Lippe | |
| 2016/0028714 A1 | 1/2016 | Umberger | |
| 2017/0178105 A1* | 6/2017 | Flett | H04L 63/083 |
| 2019/0243631 A1* | 8/2019 | Sharma | G06F 21/572 |
| 2020/0252292 A1 | 8/2020 | Mercier | |

* cited by examiner

*Primary Examiner* — Nelson S. Giddins
(74) *Attorney, Agent, or Firm* — King Intellectual Asset Management

(57) ABSTRACT

Firmware passwords, such as BIOS passwords can be managed by a remotely executed management service. A password reset command can be generated and transmitted to a client device. A management agent can execute the command and provide confirmation to a management service that the password has been updated.

20 Claims, 5 Drawing Sheets

FIRMWARE PASSWORD MANAGEMENT

CROSS-REFERENCE TO RELATED APPLICATIONS

This application is a continuation of and claims the benefit of U.S. patent application Ser. No. 16/910,539, entitled "FIRMWARE PASSWORD MANAGEMENT," and filed Jun. 24, 2020, which is hereby incorporated by reference in its entirety.

BACKGROUND

Administrators of corporate networks and other enterprise infrastructure are expected to enforce policy compliance for any device that an employee can use for work. Administrators at some enterprises require an employee to enroll with a management service capable of protecting enterprise data. The management service can deploy programmatic agents that can configure device settings at an application, operating system, or a networking level. However, these programmatic agents may be restricted from configuring settings for the firmware of the managed devices.

System Integrators and Original Equipment Manufacturers (OEMs) offer tools that allow administrators to access firmware settings of a device. For example, depending on the firmware, administrators can create scripts that use the tools to access firmware settings of individual devices and read or specify values for individual firmware settings. Unfortunately, remotely configuring a device, or a multitude of devices with varying firmwares, can be problematic even when using these tools. As a result, enterprises customers may fail to properly secure or password protect device firmware, such as a basic input/output system (BIOS) firmware for enterprise personal computers.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to managing firmware for client devices enrolled with an enterprise mobility management (EMM) system. The EMM system can maintain a record for each client device managed by the EMM, which includes a profile for that specifies preferred or mandatory values for various firmware settings. The EMM system can enforce various policies for the firmware of an enrolled client device, such as requiring a minimum firmware version to be installed or requiring various settings of the firmware to be configured in a particular manner.

Some EMM systems provide firmware management capabilities that provide for setting firmware properties. However, certain firmware management capabilities only provide a basic input-output system (BIOS) profile that allows for the setting of a single password or require a user to manually select or input a password. In other words, tools that provide for the remote management of BIOS passwords in devices that are managed by an EMM system can be rudimentary and open a security attack vector in the form of a weak BIOS password. Accordingly, examples of this disclosure can provide for a managed BIOS password that is managed by the EMM system. In a managed BIOS password framework, passwords can be automatically managed by the EMM system on behalf of the administrator and on behalf of the managed device. Additionally, examples of the disclosure can implement a password rotation scheme that generates and updates BIOS passwords on managed device.

In one scenario, if a new version of a device profile is generated or a device profile is updated, a new BIOS password can be published to managed devices. In another scenario, if the EMM system detects that something has changed within the BIOS settings of a managed device, the EMM system can automatically change or update the BIOS password of the managed device because it is assume that the existing BIOS password was used in order to access the device. Lastly, if a known attack or vulnerability has been detected, the EMM system can deploy an updated BIOS password to multiple managed devices in bulk fashion.

Figure 1:
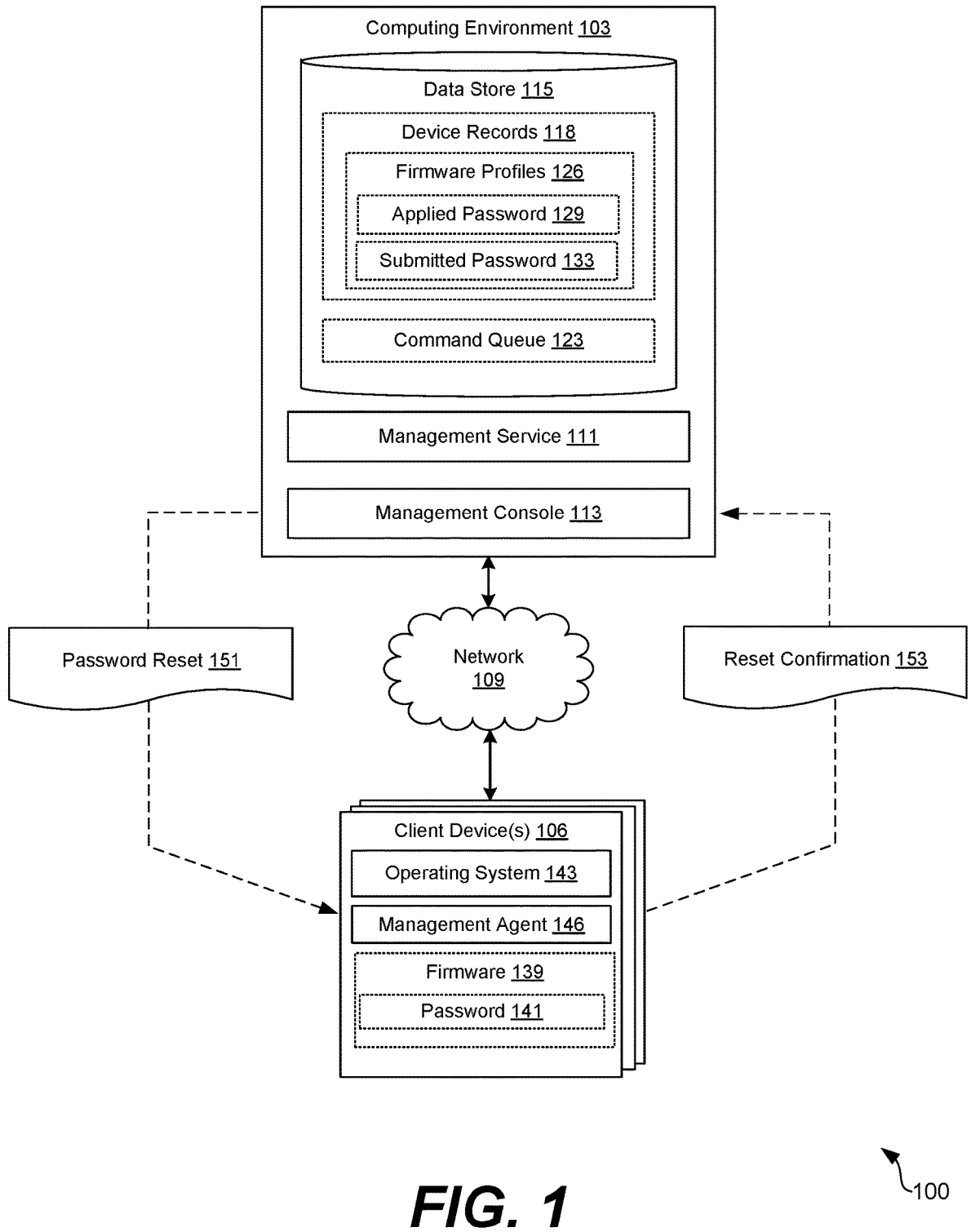
FIG. 1 is a drawing of a networked environment including a management service that communicates with managed devices.

With reference to FIG. 1, shown is an example of a networked environment 100. The networked environment 100 can include a computing environment 103 and one or more client devices 106 (also called client device 106) in communication with one other over a network 109. The network 109 can include wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement. The computing devices can be located in a single installation or can be distributed among many different geographical locations.

The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 106 remotely over the network 109, the computing environment 103 can be described as a remote computing environment 103.

Various applications can be executed in the computing environment 103. For example, a management service 111 and a management console 113, as well as other applications, may be executed in the computing environment. Also, various data is stored in a data store 115 that is accessible to the computing environment 103. The data store 115 may be representative of a plurality of data stores 115, which can include relational databases, non-relational databases, object-oriented databases, hierarchical databases, hash tables or similar key-value data stores, as well as other data storage applications or data structures. The data stored in the data store 115 is associated with the operation of the various applications or functional entities described below. This data can include one or more device records 118, a command queue 123, as well as potentially other data.

The management service 111 can be executed to oversee the operation of client devices 106 enrolled with the management service 111. In some examples, an enterprise, such as a company, organization, or other entity, can operate the management service 111 to oversee or manage the operation of the client devices 106 of its employees, contractors, customers, or other users having accounts with the enterprise. The management service 111 can further cause device records 118 to be created, modified, or removed from the data store 115. This can include adding a firmware profile 126 to a device record 118 or editing a firmware profile 126 previously applied to a device record 118. Management commands issued by the management service 111 for client devices 106, such as to apply settings specified in a firmware profile 126, can be stored in the command queue 123 by the management service 111. As discussed later, the client device 106 can access the command queue 123 and retrieve and execute any commands stored in the command queue 123 for the client device 106.

The management console 113 provides an interface for client devices 106 to interact with and control the operation of the management service 111. For example, the management console 113 can include a web server that generates one or more web pages that can be displayed on the client device 106. An administrative user can interact with the web pages served by the management console 113 to add, remove, or modify device records 118. For instance, the administrative user could use the management console 113 to update or reset a BIOS password for a client device 106 that is enrolled as a managed device. In addition, the management console 113 can also provide a public application programming interface (API) that is accessible across the network 109. Standalone applications installed on a client device 106 can call or otherwise invoke one or more functions provided by the API to programmatically control the operation of the management service 111, including adding, removing, or modifying device records 118.

A device record 118 can represent data related to a client device 106 enrolled with or otherwise managed by the management service 111. Various types of information or data can be stored in a device record 118, such as the owner or user of a client device 106, policies applicable to a client device 106, configuration settings for the client device 106, the type of client device 106 (e.g., laptop, desktop, smartphone, or tablet), the manufacturer of the client device 106, the model of the client device 106, a list of applications installed on the client device 106 and the respective version, as well as other data. For example, the device record 118 could include a firmware profile 126 for the firmware password for firmware, such as a BIOS, that is installed on the client device 106.

A firmware profile 126 can represent one aspect of the properties that are stored in a device record 118. The present disclosure is directed to password management of firmware passwords, such as a BIOS password of a client device 106. The firmware profile 126 can store an applied password 129 and a submitted password 133 that correspond to a particular client device 106. In some implementations, a pending password can also be stored in a firmware profile 126. The applied password 129 can represent a BIOS password for a managed client device 106 that has been confirmed to have been applied to the firmware 139 installed on the client device 106. A management agent 146 running on the client device 106 can provide the confirmation that a password has been applied to the firmware 139. A submitted password 133 represents a password that has been generated by the management service 111 or a user and submitted to the client device 106 to apply to the firmware 139, but confirmation that the password has been applied has not yet been received by the client device 106.

A device record 118 can also store other aspects that correspond to firmware 139 installed on a client device 106. For example, the device record 118 can store values for various firmware properties, such as the current version of the firmware 139 installed or the version of the firmware 139 that is to be installed. Likewise, the device record 118 could specify values that are to be set for other firmware attributes or values that are currently set for firmware attributes. A firmware attribute or property can represent data regarding the firmware 139 installed on a client device 106.

The management service 111 various aspects of a client device 106, such as various attributes of the firmware 139. For example, a firmware 139 can provide settings that allow a user to enable or disable hardware features provided by the client device 106 (e.g., symmetric multithreading (SMT), a trusted platform module (TPM) installed on the client device 106, processor instruction sets (e.g., virtualization instructions), wake-on-lan (WOL) functionality, power consumption features, or similar hardware features), otherwise configure the operation of the client device 106 (e.g., specifying a boot device order, configuring a clock speed of the processor or memory of the client device, configuring memory timings for the client device 106, or similar settings). Each setting may be represented in a user interface provided by the management console 113 for management by an administrator. Each can have a corresponding value that specifies whether the feature is enabled, disabled, or specifies an operational parameter for the feature.

A command queue 123 can represent a set of pending commands or instructions issued by the management service 111 to one or more client devices 106. In some implementations, a command queue 123 may be created for each client device 106 enrolled or registered with the management service 111. Commands relating to a firmware profile 126 or other firmware settings for a client device can be stored in the command queue 123. At periodic intervals, the client device 106 can retrieve instructions from the respective command queue 123 for the client device 106. In other implementations, a single command queue 123 may be used for all client devices 106. In these implementations, a command or instruction stored in the command queue 123 can be tagged with a unique identifier for a client device 106. The client device 106 can retrieve any commands or instructions from the command queue tagged with the respective unique identifier for the client device 106. Commands in the command queue 123 can include a password reset 151 that includes an applied password 129 that is currently applied to a client device 106 and a new password to which the existing password should be changed in the firmware 139.

The client device 106 is representative of one or more client devices that may be connected to the network 109. Examples of client devices 106 include processor-based systems, such as desktop computers, a laptop computers, a personal digital assistant, a cellular telephone, a smartphone, a tablet computer system, smart speakers or similar headless devices, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include firmware 139 that can provide low-level control of the operation of the hardware of the client device 106. In some instances, firmware 139 can provide a standardized operating environment for more complex software executing on the client device 106. For example, the PC-compatible Basic Input/Output System (PC-BIOS) used by many desktops, laptops, and servers initializes and test system hardware components, enables or disables hardware functions as specified in the PC-BIOS configuration, and the loads a boot-loader from memory to initialize an operating system of the client device 106. The PC-BIOS also provides a hardware abstraction layer (HAL) for keyboard, display, and other input/output devices which may be used by the operating system of the client device 106. The Unified Extensible Firmware Interface (UEFI) provides similar functions as the BIOS, as well as various additional functions such as Secure Boot, a shell environment for interacting with the client device 106, network 109 connectivity for the client device 106, and various other functions. Other client devices 106 may use other implementations of firmware 139 (e.g., OpenFirmware/OpenBoot, Coreboot, Libreboot, and similar implementations)

The firmware 139 can be protected with a password 141. The firmware 139 can require the password 141 to make changes to the various settings and attributes within the firmware 139. In some examples, the firmware 139 can also be associated with a TPM chip that can provide additional security and protection to the firmware 139. In one example, whenever a setting or attribute in the firmware 139 has been changed, a hash or other value maintained by the TPM chip also changes, enabling detection of any change or update to the firmware 139 on the client device 106. Additionally, to perform updates to the password 141, the firmware 139 can require that the existing password be provided before changing the password 141 to a new value.

A client device 106 can include an operating system configured to execute various client applications. Examples of operating systems include MICROSOFT WINDOWS®, APPLE macOS®, APPLE iOS®, GOOGLE ANDROID®, and various distributions of Linux. The client applications can include web browsers, enterprise applications, social networking applications, word processors, spreadsheet applications, and media viewing applications. The client device 106 can also execute the management agent 146.

The management agent 146 can maintain communication with the management service 111 to perform various actions on the client device 106 in response to instructions received from the management service 111. In some instances, the management agent 146 includes a separate application executing on the client device 106. In other instances, the management agent 146 includes a mobile device management (MDM) framework provided by or included in the operating system 143 installed on the client device 106. The management agent 146 can contact the management service 111 at periodic intervals and request that the management service 111 send any commands or instructions stored in the command queue 123 to the management agent 146. The management agent 146 can then cause the client device 106 to perform the commands provided by the management service 111 or cause the client device 106 to modify the firmware 139 installed on the client device 106 to match the values of one or more firmware attributes specified by the device record 118 received from the management service 111. Again, one example of a firmware attribute that can be modified by the management service 111 is a password 141 associated with the firmware 139.

In some implementations, a firmware agent can be executed by the client device 106 to expose configuration settings and values of the firmware 139 to a user or other applications. In some embodiments, the firmware agent can expose an application programing interface (API) that can be used by other applications, such as the management agent 146, to interact with the firmware 139. For example, the API exposed by the firmware agent can allow the management agent 146 to update the installed version of the firmware 139, modify a configuration setting for the firmware 139, update the firmware password 141, or perform other firmware management tasks. Because firmware 139 is often customized for each make and model of a client device 106 due to various hardware differences between vendors or models, the firmware agent is often provided by the manufacturer of the client device 106. For example, DELL, HP, LENOVO, and other manufacturers may provide their own firmware agent for client devices 106 that they manufacture.

The management agent 146 can be installed with administrator or elevated privileges on the client device 106 so that it possesses sufficient permissions to edit parameters in the password 141 of a client device 106. The management agent 146 can also have access to certain APIs or libraries within the operating system or OEM APIs or libraries that permit the management agent 146 to edit firmware properties such as the password 141 or other settings in the firmware 139.

Next, a general description of the operation of the various components of the networked environment 100 is provided. To begin, a user can create and/or configure a device record 118 for one or more client devices 106 through a user interface provided by the management console 113. In some examples, a device record 118 can be automatically created for a client device 106 when the device is enrolled with the management service 111 as a managed device. For example, the user could specify values for individual firmware attributes. For instance, the user could specify that specific hardware features be enabled, such as symmetric multi-threading, virtualization instructions, or other features. The user could also specify a password 141 for the client device 106. However, in large scale deployments, oftentimes, the device records 118 are created based upon a template and as a result, either no password 141 is specified for the firmware 139 or the same password is specified for client devices 106 that are based on the template.

Accordingly, examples of the disclosure can facilitate password management capabilities for firmware passwords 141 for devices that are enrolled as managed devices with the management service 111. Once a device record 118 has been created, a password can be generated by the management service 111 and saved to the firmware profile 126 as a submitted password 133. The management service 111 can place a command into the command queue 123 for a client device 106 to update the password 141 of the firmware 139. The command can include the firmware attributes as well as a current password 141 of the firmware 139, if any has been set. In some instances, the current password 141 of the firmware 139 can include a default password. In other instances, the current password 141 of the firmware 139 can be provided by the management agent 146 to the management service 111 upon enrollment with the management service 111 as a managed device and stored in the data store 115.

The management service 111 can reset or update the password 141 of the firmware 139 in various scenarios. In a first scenario, the password 141 can be updated at the behest of a user on the management console 113. An administrative user can manually update the password 141 of the firmware 139 for a client device 106 or request that the management service 111 generate a random password 141 for the firmware 139. In some scenarios, the management console 113 can allow a user to request that the management service 111 generate a random password for a plurality of client devices 106 at once. The plurality of client devices 106 can be chosen by selecting a grouping of client devices 106 in the management console 113 by an attribute by which the devices can be grouped.

In another scenario, the management service 111 can request a password 141 to be updated or reset in response to a setting within the firmware 139 being changed on the client device 106. If a firmware 139 setting change is detected, it can be assumed that the existing password 141 for the firmware 139 was accessed or used by the client device 106. In many cases, in order to change a firmware 139 setting, the password 141 is required. Accordingly, any time a firmware 139 setting is changed, because the password 141 would have been used to make the change, the password 141 can be updated to a new password 141. The new password 141 can be randomly generated or generated according to a password generation algorithm.

The management agent 146 can detect the change in a firmware 139 setting by detecting the change in a hash code or other value set by a TPM module that reflects the state of the firmware 139. In many platforms, a TPM module or other subsystem of the client device 106 can maintain a hash code or version number associated with the state of the firmware 139. When any value or setting in the firmware 139 is changed or updated, the hash code or version number can also change. Accordingly, the management agent 146 can detect such a change by communicating with the TPM or other module of the client device 106 that reflects the state of the BIOS. The management agent 146 can then notify the management service 111 of the change, which can cause the management service 111 to generate a request to update the password 141 of the firmware 139.

To change the password 141, the management service 111 can submit a password reset 151 command to the management agent 146. The password reset 151 can the applied password 129 of the client device 106, which is also the existing password 141 of the firmware 139, and a new password, or a pending password to which the password 141 is being changed. The management agent 146 can obtain the password reset 151 command from the command queue 123 can perform the password change. The management agent 146 can transmit a reset confirmation 153 to the management service 111 in response to performing the password reset 151 command and updating the password 141 in the firmware 139. In response to receiving the reset confirmation 153, the management service 111 can overwrite the firmware properties in the device record 118 corresponding to the client device 106.

Figure 2:
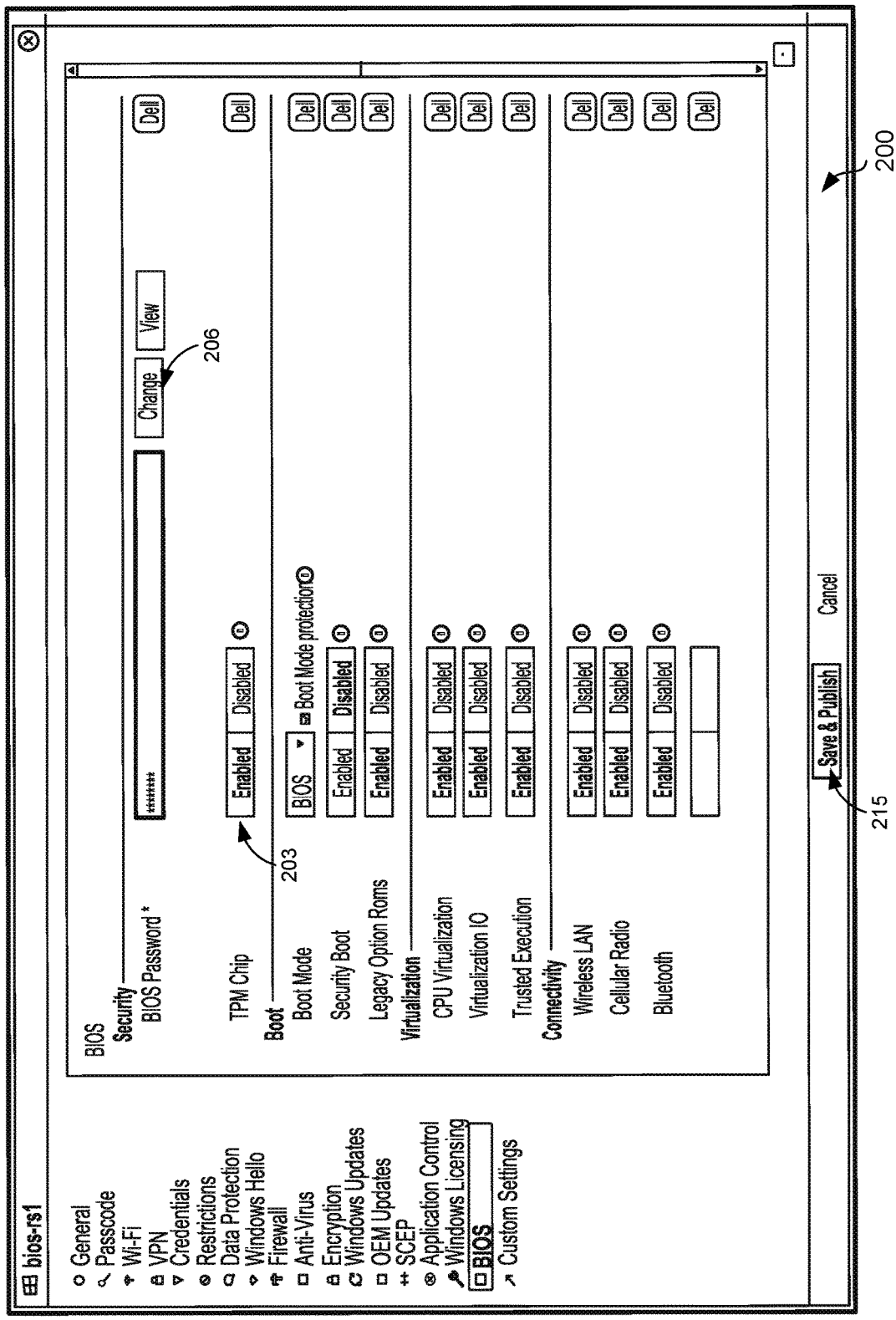
FIG. 2 is a drawing of a user interface of an administrator console for managing BIOS.

Referring now to FIG. 2, shown is an example of a user interface 200 generated by the management console 113, such as a web page, where settings of firmware attributes can be specified. For instance, the firmware profile 126 shown indicates that a TPM chip should be enabled in the firmware 139 of the client device 106 by emphasizing a user interface element 203 showing Enabled. A different client device 106 having a TPM chip or other similar hardware configuration can also be associated with the firmware profile 126. The management console 113 can generate a user interface showing for example that the different client device 106 has a TPM chip that is not enabled (not shown). In that case, a user interface element showing Disabled would be emphasized. As depicted, the user interface 200 can allow an administrator to manage settings of firmware attributes that make up a firmware profile 126. Firmware attributes can be grouped together. For example, the user interface 200 shows groups of Security settings, Boot settings, Virtualization settings, Connectivity settings, Storage settings, and Power Management settings. Some examples of security settings that can be defined by an administrator and stored in a firmware profile 126 include firmware password and TPM chip.

A firmware password can be a series of letters, numbers, and special characters. The user interface 200 provides a change password button 206 that allows an administrator to change a firmware password for a client device 106 or a group of client devices 106. In some implementations, the updated password for the firmware 139 can be user specified or randomly generated according to a password generation algorithm.

Boot settings that can be defined by an administrator and stored in a device record 118. Boot settings include a user interface element that can specify a boot mode of firmware 139. The boot mode can be set to protected by clicking a check box. There is a Secure Boot option that allows an administrator to enable or disable a secure boot. Finally, a legacy option ROMs option can be set to enabled or disabled. Various other BIOS options or firmware options can be selected and configured utilizing the management console 113.

As depicted, various settings can be defined by an administrator and stored in a device record 118. Virtualization settings can include CPU virtualization, Virtualization 10, and Trusted Execution. Connectivity settings can include Wireless LAN Enable/Disable, Cellular Radio Enable/Disable, Bluetooth Enable/Disable, and GPS Enable/Disable. Storage settings can include Self-Monitoring, Analysis, and Reporting Technology (SMART) Reporting Enable/Disable.

The user interface 200 can allow the administrator to save a firmware profile 126. In some examples, clicking a save and publish element 215 on the user interface 200 allows the management service 111 to proceed to publish a firmware profile 126 to a client device 106 as a firmware profile 126, as depicted in FIG. 1. If the user has updated the password reset 151 of the firmware 139, the management service 111 can generate a password reset 151 command that is provided to the management agent 146, which can execute the password reset 151 to update the password 141 in the firmware 139.

In some examples, the user interface 200 can allow a user to direct the management service 111 to update a password in a grouping of client devices 106 that are managed by the management service 111. The grouping of client devices 106 can be created by utilizing filters or tools within the management console 113 to categorize client devices 106 by various attributes. In one example, the management service 111 can identify client devices 106 that have a particular version of the firmware 139. The management console 113 can allow the user to direct the management service 111 to cause a password reset 151 for each of the client devices 106 in the grouping so that each device is assigned a randomly generated password.

Figure 3:
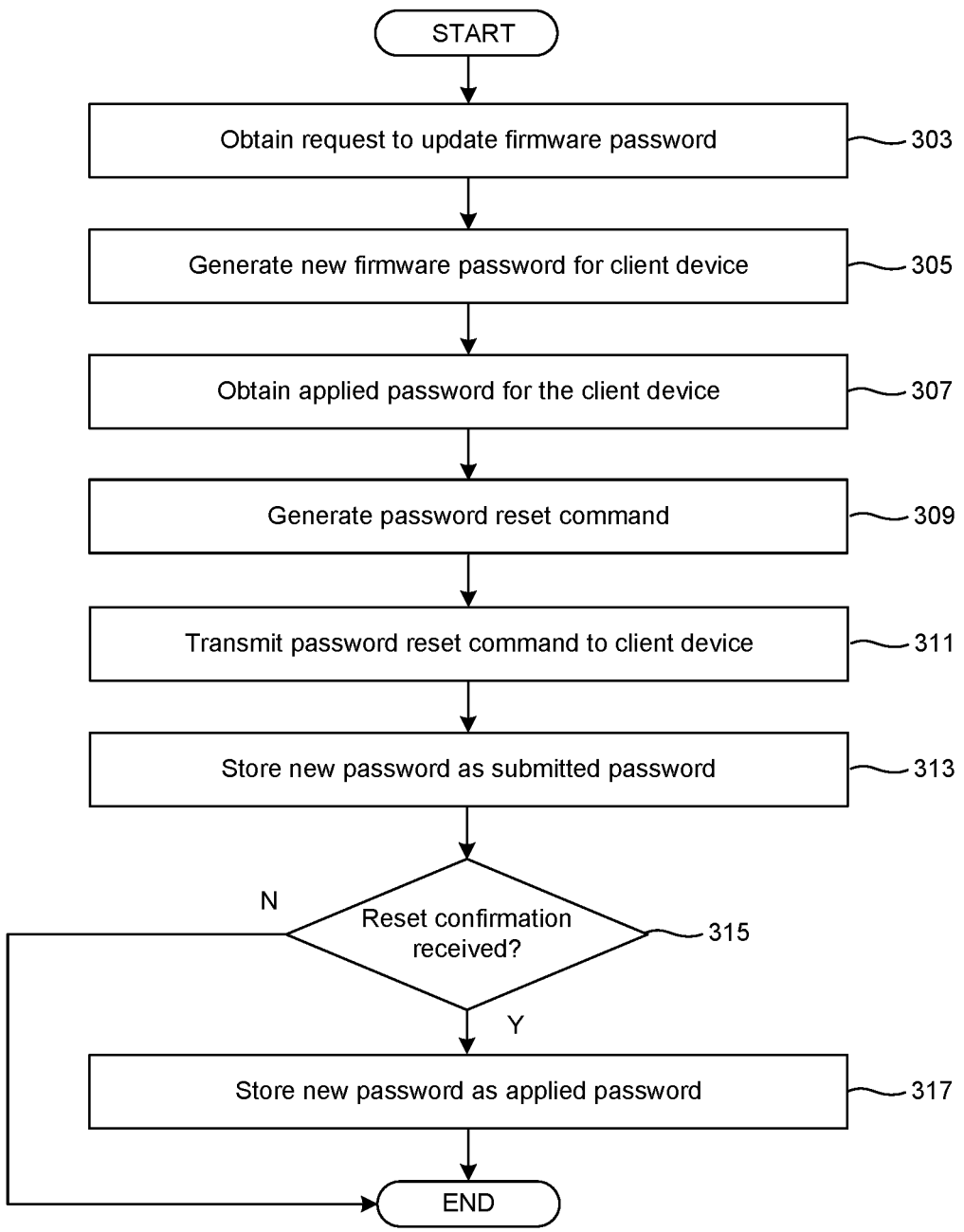
FIG. 3 is a flowchart illustrating functionality implemented by components of the networked environment of FIG. 1.

Moving on to FIG. 3, shown is a flowchart that provides one example of the operation of a portion of the management service 111. The flowchart of FIG. 3 can be viewed as depicting an example of elements of a method implemented by the management service 111 executing in the computing environment 103 according to one or more examples. The separation or segmentation of functionality as discussed herein is presented for illustrative purposes only. FIG. 3 illustrates how the management service 111 can update a password 141 in firmware 139 of a client device 106 that is enrolled as a managed device.

Beginning with step 303, the management service 111 can obtain a request to update a password 141 of firmware 139 on a client device 106 that is enrolled as a managed device with the management service 111. The request can be obtained from the management console 113 and originating from a user that has requested that the password 141 be updated with a user interface provided by the management console 113. The request can be associated with a single client device 106. In some cases, the request can be associated with a request to update the password 141 on multiple client devices 106 that are enrolled as managed devices. In this scenario, the steps shown in FIG. 3 can be performed in bulk fashion for multiple client device 106.

Next, at step 305, the management service 111 can generate a new password 141 for the firmware 139. The newly generated password 141 can be a random password or generated using a password algorithm that takes into account password complexity rules that specify a minimum password complexity. The newly generated password 141 can also take into account password repetition rules that require the password 141 to be sufficiently different from a previously utilized password for the firmware 139.

At step 307, the management service 111 can obtain applied password 129 corresponding to the client device 106. The applied password 129 can be the password 141 that has been confirmed by the management agent 146 as having been applied to the firmware 139. The applied password 129 can be required by the firmware 139 to change the password 141 that is associated with the firmware 139.

At step 309, the management service 111 can generate a password reset 151 command that can be placed in a command queue 123. The password reset 151 can include the applied password 129 and the newly generated password. In some embodiments, the newly generated password can be saved in memory or saved to the data store 115 as a pending password before it is submitted to the management agent 146. The password reset 151 can include a command or instruction that instructs the management agent 146 to change the password 141 of the firmware 139 to the newly generated or pending password.

At step 311, the management service 111 can transmit the password reset 151 to the client device 106. The password reset 151 can be placed into a command queue 123 that corresponds to the client device 106. The management agent 146 can be configured to periodically check in or retrieve commands from the command queue 123 that are intended for the client device 106 on which the management agent 146 is executing.

Next, at step 313, the management service 111, once the management agent 146 executing on the client device 106 has retrieved the password reset 151 from the command queue 123, can save the newly generated password as the submitted password 133 corresponding to the client device 106.

At step 315, the management service 111 can determine whether the reset confirmation 153 has been received from the management agent 146. The reset confirmation 153 can confirm that the password reset 151 has been executed by the management agent 146 and that the password has been updated in the firmware 139. The management service 111 can wait for the reset confirmation 153 and identify that a firmware profile 126 has been created that pertains to a client device 106. The management service 111 need not synchronously wait for the reset confirmation 153. The management service 111 can also obtain the reset confirmation 153 asynchronously while performing other management tasks or communicating with other client devices 106. If no reset confirmation 153 is received, the process can proceed to completion.

If the reset confirmation 153 is received, the process can proceed to step 317. At step 317, the management service 111 can overwrite the applied password 129 with the submitted password 133. The reset confirmation 153 can confirm that the management agent 146 has successfully updated the password 141 on the firmware 139. Thereafter, the process can proceed to completion.

Figure 4:
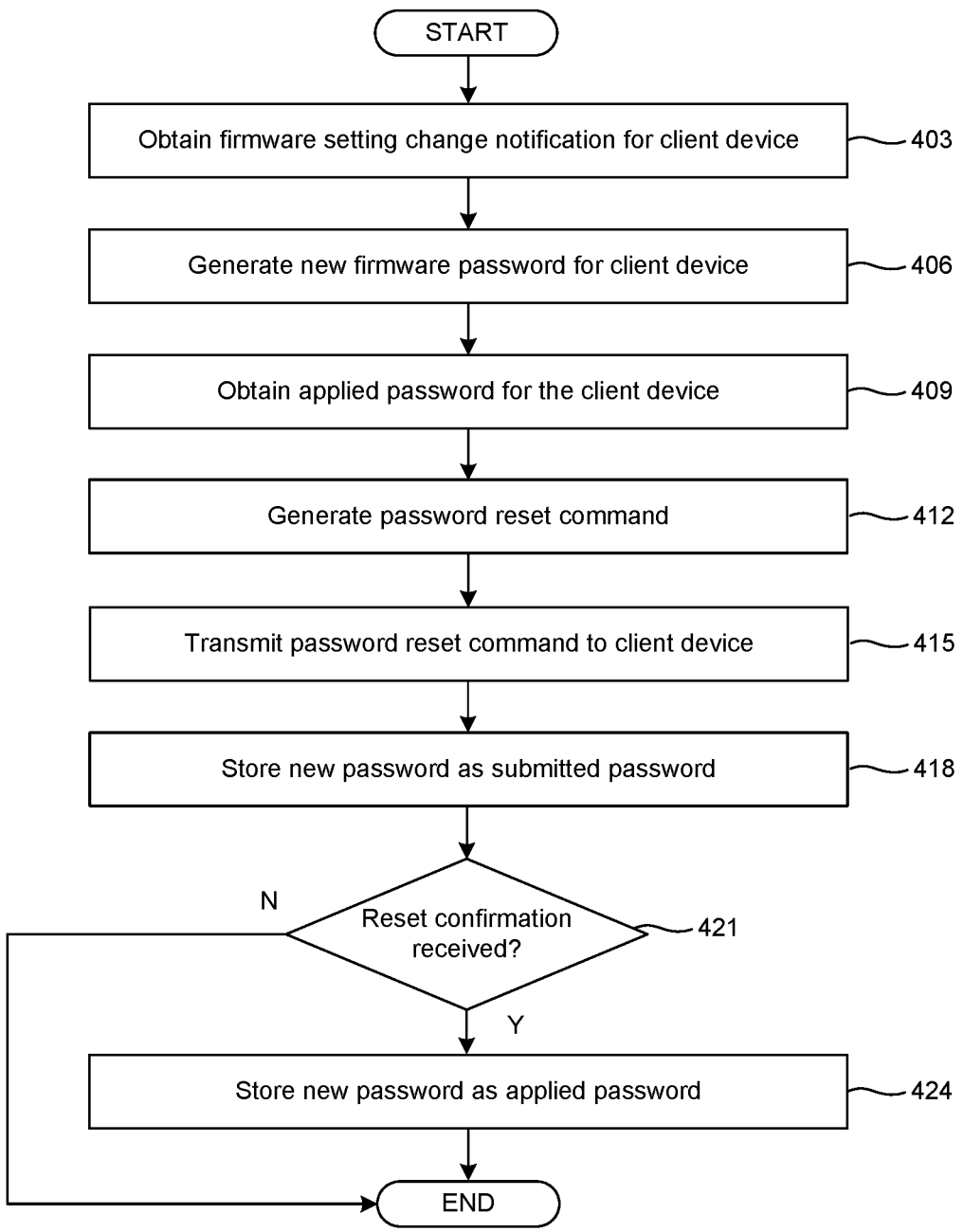
FIG. 4 is a flowchart illustrating functionality implemented by component of the networked environment of FIG. 1.

Moving on to FIG. 4, shown is a flowchart that provides one example of the operation of a portion of the management service 111. The flowchart of FIG. 4 can be viewed as depicting an example of elements of a method implemented by the management service 111 executing in the computing environment 103 according to one or more examples. The separation or segmentation of functionality as discussed herein is presented for illustrative purposes only. FIG. 4 illustrates how the management service 111 can update a password 141 in firmware 139 of a client device 106 that is enrolled as a managed device in response to a firmware setting being updated in the client device 106.

Beginning with step 403, the management service 111 can obtain an indication that a setting or attribute in the firmware 139 of a client device 106 that is enrolled as a managed device has been changed. The indication can be received from the management agent 146. The indication can be obtained by the management agent 146 on the client device 106 from a TPM chip or other module that provides a hash, version, or other indication that a firmware 139 has been changed on the client device 106. If a setting or attribute has been changed or updated, an assumption can be made that the password 141 has been utilized because in many cases, the password 141 is required to make any changes to firmware 139 settings, such as any change to a BIOS attribute, setting, or property on a client device 106. To this end, the management agent 146 can poll the TPM chip or other module within the client device 106 that reflects the state of the firmware settings of the firmware 139. Upon detecting that a setting has been changed, the management agent 146 can inform the management service 111 that a setting in the firmware 139 has been changed. The communication from the management agent 146 that a BIOS setting has changed can operate as a request to update the password 141 of the firmware 139. In embodiments of this disclosure, any time a password is utilized to update a firmware 139 setting, the password 141 can be considered compromised, and so the password 141 can be changed. In this case, the request to change the password 141 can be associated with a single client device 106 from which the indication is received.

In some embodiments, the indication can also comprise an indication that the firmware 139 or BIOS on the client device 106 has been updated to a different version. In some examples, upon obtaining an indication that the firmware 139 has been updated, the management service 111 can be instrumented to perform a password reset for those client devices 106.

Next, at step 406, the management service 111 can generate a new password 141 for the firmware 139. The newly generated password 141 can be a random password or generated using a password algorithm that takes into account password complexity rules that specify a minimum password complexity. The newly generated password 141 can also take into account password repetition rules that require the password 141 to be sufficiently different from a previously utilized password for the firmware 139.

At step 409, the management service 111 can obtain applied password 129 corresponding to the client device 106. The applied password 129 can be the password 141 that has been confirmed by the management agent 146 as having been applied to the firmware 139. The applied password 129 can be required by the firmware 139 to change the password 141 that is associated with the firmware 139.

At step 412, the management service 111 can generate a password reset 151 command that can be placed in a command queue 123. The password reset 151 can include the applied password 129 and the newly generated password. In some embodiments, the newly generated password can be saved in memory or saved to the data store 115 as a pending password before it is submitted to the management agent 146. The password reset 151 can include a command or instruction that instructs the management agent 146 to change the password 141 of the firmware 139 to the newly generated or pending password.

At step 415, the management service 111 can transmit the password reset 151 to the client device 106. The password reset 151 can be placed into a command queue 123 that corresponds to the client device 106. The management agent 146 can be configured to periodically check in or retrieve commands from the command queue 123 that are intended for the client device 106 on which the management agent 146 is executing.

Next, at step 418, the management service 111, once the management agent 146 executing on the client device 106 has retrieved the password reset 151 from the command queue 123, can save the newly generated password as the submitted password 133 corresponding to the client device 106.

At step 421, the management service 111 can determine whether the reset confirmation 153 has been received from the management agent 146. The reset confirmation 153 can confirm that the password reset 151 has been executed by the management agent 146 and that the password has been updated in the firmware 139. The management service 111 can wait for the reset confirmation 153 and identify that a firmware profile 126 has been created that pertains to a client device 106. The management service 111 need not synchronously wait for the reset confirmation 153. The management service 111 can also obtain the reset confirmation 153 asynchronously while performing other management tasks or communicating with other client devices 106. If no reset confirmation 153 is received, the process can proceed to completion.

If the reset confirmation 153 is received, the process can proceed to step 424. At step 317, the management service 111 can overwrite the applied password 129 with the submitted password 133. The reset confirmation 153 can confirm that the management agent 146 has successfully updated the password 141 on the firmware 139. Thereafter, the process can proceed to completion.

Figure 5:
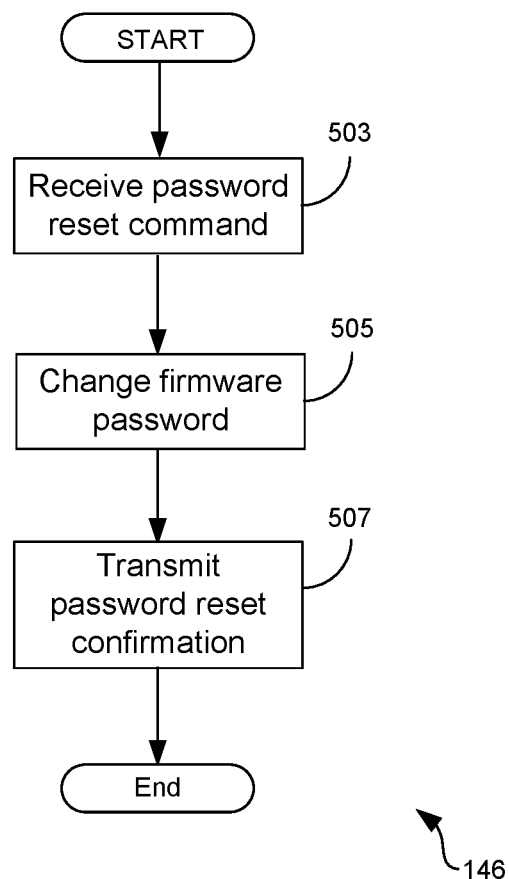
FIG. 5 is a flowchart illustrating functionality implemented by component of the networked environment of FIG. 1.

Moving on to FIG. 5, shown is a flowchart that provides one example of the operation of a portion of the management agent 146. The flowchart of FIG. 5 can be viewed as depicting an example of elements of a method implemented by the management agent 146 according to one or more examples. The separation or segmentation of functionality as discussed herein is presented for illustrative purposes only. FIG. 5 illustrates how the management agent 146 running on a client device 106 that is a managed device can update a password 141 in the firmware 139, such as in the BIOS of the client device 106.

First, at step 503, the management agent 146 can receive a password reset 151 command. The password reset 151 command can include the current password, or the applied password 129 of the password 141. The password reset 151 can also include the newly created password, whether the newly created password is generated by the management service 111 or specified by a user.

At step 505, the management agent 146 can update the password 141 in the firmware 139. The management agent 146 can utilize an API or library provided by an OEM firmware installed on the client device 106. The firmware 139 can provide a command that allows an application with sufficient privileges or with the correct password to change firmware settings, such as the password 141. Accordingly, the management agent 146 can execute the command to update the password 141 with the newly supplied password in the password reset 151.

Upon updating the password 141, the management agent 146 can transmit the reset confirmation 153 to the management service 111. The reset confirmation 153 can provide an indication or confirmation that the password 141 has been updated in the firmware 139. Upon updating the password 141, the process can proceed to completion.

The client devices 106 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the management agent 146 and potentially other applications. Also stored in the memory can be a data store 115 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display upon which a user interface generated by the management console 113, the management agent 146, the firmware 139, or another application can be rendered. In some examples, the user interface can be generated using user interface data provided by the computing environment 103. The client device 106 can also include one or more input/output devices that can include, for example, a capacitive touchscreen or other type of touch input device, fingerprint reader, or keyboard.

Although the management service 111, management console 113, the management agent 146, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts of FIG. 3-5 show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowchart shows a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A client device, comprising:
a processor and a memory; and
machine-readable instructions stored in the memory which, when executed by the processor, cause the client device to at least:
initiate enrollment of the client device as a managed device among a plurality of managed devices that are managed by a management service;
obtain a request to update a basic input output system (BIOS) password on the client device, wherein the request comprises a new BIOS password for the client device, wherein the request further comprises a command to perform a password reset; and
cause a management agent on the client device to perform the password reset within the BIOS of the client device, wherein the new BIOS password is stored in a device record as a submitted password by a management service.

2. The client device of claim 1, wherein the machine-readable instructions, when executed by the processor, further cause the client device to at least:

transmit a password reset confirmation from the management agent executed by the client device to the management service.

3. The client device of claim 2, wherein the machine-readable instructions, when executed by the processor, further cause the client device to at least:
store the new BIOS password as a current BIOS password in the client device.

4. The client device of claim 1, wherein the request comprises a randomly generated new BIOS password generated from among a plurality of randomly generated new BIOS passwords for a plurality of managed devices managed by the management service.

5. The client device of claim 1, wherein the machine-readable instructions, when executed by the processor, further cause the client device to at least:
generate an indication that at least one BIOS setting on the client device has changed; and
automatically cause the management service to generate the request to update the BIOS password in response to obtaining the indication.

6. The client device of claim 5, wherein the indication is obtained in response to a trusted platform module (TPM) chip on the client device indicating that a value indicating a state of the BIOS has changed.

7. The client device of claim 1, wherein the command is generated in response to the BIOS being updated to a different version.

8. A non-transitory computer-readable medium embodying executable instructions which, when executed by a client device, cause the client device to at least:
initiate enrollment of the client device as a managed device among a plurality of managed devices that are managed by a management service;
obtain a request to update a basic input output system (BIOS) password on the client device, wherein the request comprises a new BIOS password for the client device, wherein the request further comprises a command to perform a password reset; and
cause a management agent on the client device to perform the password reset within the BIOS of the client device, wherein the new BIOS password is stored in a device record as a submitted password by a management service.

9. The non-transitory computer-readable medium of claim 8, further comprising executable instructions which, when executed by the client device, further cause the client device to at least:
transmit a password reset confirmation from the management agent executed by the client device to the management service.

10. The non-transitory computer-readable medium of claim 9, further comprising executable instructions which, when executed by the client device, further cause the client device to at least:
store the new BIOS password as a current BIOS password in the client device.

11. The non-transitory computer-readable medium of claim 8, wherein the request comprises a randomly generated new BIOS password generated from among a plurality of randomly generated new BIOS passwords for a plurality of managed devices managed by the management service.

12. The non-transitory computer-readable medium of claim 8, further comprising executable instructions which, when executed by the client device, further cause the client device to at least:
generate an indication that at least one BIOS setting on the client device has changed; and
automatically cause the management service to generate the request to update the BIOS password in response to obtaining the indication.

13. The non-transitory computer-readable medium of claim 12, wherein the indication is obtained in response to a trusted platform module (TPM) chip on the client device indicating that a value indicating a state of the BIOS has changed.

14. The non-transitory computer-readable medium of claim 8, wherein the command is generated in response to the BIOS being updated to a different version.

15. A method, comprising:
initiating enrollment of a client device as a managed device among a plurality of managed devices that are managed by a management service;
obtaining a request to update a basic input output system (BIOS) password on the client device, wherein the request comprises a new BIOS password for the client device, wherein the request further comprises a command to perform a password reset; and
causing a management agent on the client device to perform the password reset within the BIOS of the client device, wherein the new BIOS password is stored in a device record as a submitted password by a management service.

16. The method of claim 15, further comprising transmitting a password reset confirmation from the management agent executed by the client device to the management service.

17. The method of claim 16, further comprising storing the new BIOS password as a current BIOS password in the client device.

18. The method of claim 15, wherein the request comprises a randomly generated new BIOS password generated from among a plurality of randomly generated new BIOS passwords for a plurality of managed devices managed by the management service.

19. The method of claim 15, further comprising:
generating an indication that at least one BIOS setting on the client device has changed; and
automatically causing the management service to generate the request to update the BIOS password in response to obtaining the indication.

20. The method of claim 15, wherein the command is generated in response to the BIOS being updated to a different version.

* * * * *